United States Patent [19]

Park

[11] 4,151,056

[45] Apr. 24, 1979

[54] RADIATION CURABLE COATING COMPOSITIONS CONTAINING ALKANEDIONES OR CYCLOALKANEDIONES

[75] Inventor: Kisoon Park, Charleston, W. Va.

[73] Assignee: Union Carbide Corporation, New York, N.Y.

[21] Appl. No.: 837,877

[22] Filed: Sep. 29, 1977

[51] Int. Cl.$^2$ ............................................. C08F 8/00
[52] U.S. Cl. ........................... 204/159.16; 204/159.14; 204/159.15; 204/159.19; 528/75; 528/228; 260/23 EP; 260/17 R; 260/17.4 R; 260/837 R; 260/859 R; 427/54; 428/425; 428/442; 526/55

[58] Field of Search ...................... 204/159.14, 159.15, 204/159.16, 159.19; 260/63 R, 63 N, 66, 859

[56] References Cited

U.S. PATENT DOCUMENTS

| | | | |
|---|---|---|---|
| 3,700,643 | 10/1972 | Smith et al. | 260/77.5 AN |
| 3,782,961 | 1/1974 | Takahashi et al. | 96/115 R |
| 3,974,053 | 8/1976 | Nemcek et al. | 204/159.15 |
| 3,998,979 | 12/1976 | Armstrong et al. | 427/54 |

Primary Examiner—Richard B. Turer
Attorney, Agent, or Firm—Francis M. Fazio

[57] ABSTRACT

Alkanediones or cycloalkanediones are employed as low-toxicity constituents in radiation curable coating compositions.

10 Claims, No Drawings

RADIATION CURABLE COATING COMPOSITIONS CONTAINING ALKANEDIONES OR CYCLOALKANEDIONES

BACKGROUND OF THE INVENTION

Increasing restrictions on the amount and types of volatiles which may be released in work environments and the desire to reduce energy consumption have prompted the development of radiation curable coating compositions which are essentially free of volatile solvents that must be evaporated during the curing of the composition. These solvent-free coating compositions are known as 100 percent reactive systems; that is, each component of the composition reacts and becomes incorporated into the cured coating when the composition is exposed to radiation.

The radiation curable coating compositions of the prior art typically contain a radiation reactive oligomer or resin, a radiation reactive diluent, a photoinitiator and, optionally a radiation reactive crosslinker. The radiation reactive diluent serves the function of reducing the viscosity of the oligomer or resin in order that the composition, in the uncured state, has a viscosity such that it can easily be applied as a film to a substrate using conventional techniques of the coatings art.

Virtually any monomer or oligomer which can be polymerized by a conventional thermally initiated polymerization reaction can be employed as one of the radiation reactive components of the radiation curable coating compositions of the prior art. However, compounds containing acrylyl or methacrylyl groups have become by far the most widely used components of radiation curable coating compositions because of the ease and rapidity with which the acrylyl or methacrylyl groups undergo radiation-induced addition polymerization. Monofunctional monomeric acrylate or methacrylate esters are generally employed as the radiation reactive diluent; monomeric polyfunctional acrylate or methacrylate esters are employed as the crosslinking agent; and oligomers or resins containing one or more acrylyl or methacrylyl groups are employed as the oligomer or resin component.

While the aforementioned acrylyl and methacrylyl bearing compounds are excellent in terms of their radiation responsiveness, and they produce cured coatings having good physical properties, their use in radiation curable coating compositions has disadvantages related to their generally high levels of toxicity. Special handling techniques generally must be used to prevent workers from coming in contact with these materials or their vapors. This is particularly true of the monofunctional monomeric acrylate or methacrylate diluent, since it is usually the lowest molecular weight component and the most likely component to produce vapors. Typical monofunctional monomeric acrylate or methacrylate diluents include 2-hydroxyethyl acrylate, methyl acrylate, hexyl acrylate, 2-hydroxypropyl acrylate, glycidyl acrylate, 2-phenoxy acrylate, 2-methoxyethyl acrylate, 2-ethylhexyl acrylate, isodecyl acrylate, 2-(N-methylcarbamoyloxy) ethyl acrylate, dicyclopentyl acrylate, and the like, or the corresponding methacrylates.

When the cured coatings are to be employed in applications where they are to come in contact with the skin, even a small amount of residual unreacted acrylyl or methacrylyl monomer being present in the cured coating is a hazard, since unreacted monomer can migrate out of the coating.

The radiation curable coatings industry has been searching for low toxicity radiation reactive components which can be employed in radiation curable coating compositions to reduce the degree of dependence on acrylic compounds. It would be especially desirable to find a suitable low toxicity substitute for the monofunctional monomeric acrylate or methacrylate diluent component. To date, no completely satisfactory substitute has been found. The lack of a suitable low-toxicity diluent for radiation curable coating compositions has been an impediment to their widespread use in textile coating applications.

SUMMARY OF THE INVENTION

It has now been discovered that certain alkanediones, such as 2,4-pentanedione and 2,5-hexanedione, or cycloalkanediones, such as 1,3-cyclohexanedione, are suitably employed as reactive components of radiation curable coating compositions. This was totally unexpected and nonobvious, since the alkanediones and cycloalkanediones contain no art-recognized radiation reactive groups. The alkanediones act as excellent viscosity reducers in uncured radiation curable coating compositions containing radiation reactive oligomers or resins. The alkanediones and cycloalkanediones have the advantage of having much lower levels of toxicity than the acrylyl and methacrylyl compounds.

The present invention provides novel radiation curable coating compositions comprising a radiation curable oligomer or resin, an alkanedione or cycloalkanedione, and optionally a photoinitiator and a crosslinker.

DETAILED DESCRIPTION OF THE INVENTION

The alkanedione which is suitably employed in the radiation curable coating compositions of this invention is represented by the formula:

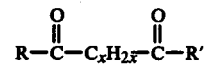

wherein x is 1 or 2 and R and R' are each alkyl of from 1 to 4 carbon atoms which may be the same as, or different from, each other. Examples of such alkanediones are 2,4-pentanedione, 2,5-hexanedione, 3,5-hexanedione, 2,4-heptanedione, 2,5-heptanedione, 3,6-octanedione, and the like.

the cycloalkanedione which is suitably employed as a component of the radiation curable coating compositions of this invention are represented by the formula:

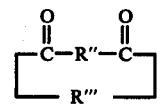

wherein R" is methylene or ethylene and R'" is an alkylene segment completing a 5 to 8 carbon ring structure. For example, the cycloalkanedione can be 1,3-cyclopentanedione, 1,3-cyclohexanedione, 1,3-cycloheptanedione, 1,3-cyclooctanedione, 1,4-cyclohexanedione, 1,4-cycloheptanedione, or 1,4-cyclooctanedione.

The alkanediones described above have utility as a diluent in the radiation curable coating compositions of this invention. Although the cycloalkanediones are generally solids at room temperature and are not particularly useful as diluents, they nevertheless have utility in the compositions insofar as they react into the system, reduce the proportion of acrylate components in the composition, and do not adversely affect the properties of the cured coating.

The alkanedione can be employed at any concentration which is sufficient to produce the desired viscosity in the uncured radiation curable coating composition. I generally employ the alkanedione or cycloalkanedione component in the radiation curable coating composition of this invention at a concentration of from 5 to 30 weight percent thereof, preferably from 10 to 20 weight percent thereof, based on the total weight of the composition.

The oligomer or resin component of the compositions of this invention is any known oligomer or resin having a viscosity of from 100 cps. to 800,000 cps. which contains at least one ethylenically unsaturated site per molecule which reacts upon exposure to actinic radiation. When ultraviolet light is to be employed to cure the radiation curable coating composition, it is preferred that the ethylenically unsaturated site be a segment of an acrylyl or methacrylyl group.

Many suitable radiation reactive oligomers and resins are known to those skilled in the art and the choice of a particular oligomer or resin does not constitute the invention herein. As merely illustrative of suitable radiation reactive oligomers or resins one can mention:

(A) Polyurethane oligomers or polymers containing one or more acrylyl or methacrylyl groups. These can be prepared by reacting a hydroxyacrylate or hydroxymethacrylate compound, such as 2-hydroxyethyl acrylate, 2-hydroxypropyl acrylate, 2-hydroxyethyl methacrylate, and the like, with an organic polyol and an organic polyisocyanate. Acrylate capped oligomers of this type are described in more detail in U.S. Pat. No. 3,700,643. The acrylate or methacrylate capped polyurethane oligomer can also typically be prepared by reacting a hydroxyl-terminated polyether acrylate or methacrylate, such as diethylene glycol monoacrylate, pentaerythritol mono- or diacrylate, or the corresponding methacrylates, with an organic polyisocyanate, as described in U.S. Pat. No. 3,782,961. The acrylate capped polyurethane can also be an adduct of hydroxyalkyl acrylate or hydroxyalkyl methacrylate with an isocyanate-terminated urethane prepolymer which is prepared by reacting a stoichiometric excess of a polyisocyanate with an organic polyol, which polyol can be, for example, a polycaprolactone polyol, polyoxyalkylene adipate polyol, polyoxytetramethylene polyol, poly(oxypropylene/oxyethylene) polyol, or the like.

(B) Adducts of ethylenically unsaturated monoisocyanates and hydroxy functional lacquer grade resins such as cellulose, nitrocellulose, hydroxyethyl cellulose, cellulose acetate butyrate, and the like. The ethylenically unsaturated monoisocyanate is typically an adduct of an hydroxyalkyl acrylate, such as 2-hydroxyethyl acrylate, and a diisocyanate, such as tolylene diisocyanate. This class of radiation reactive resins is described in greater detail in U.S. Pat. No. 3,749,592.

(C) The acrylated or methacrylated derivatives of epoxidized fatty oils or fatty acids, such as those described in U.S. Pat. Nos. 3,125,592, 3,224,989, and 3,256,225. Illustrative thereof one can mention acrylated epoxidized linseed, soybean, cottonseed, or hempseed oil, and the like.

(D) The reaction products of polyepoxides and acrylic anhydrides of monocarboxylic acids such as those described in U.S. Pat. No. 3,770,602.

(E) The reaction products of acrylic or methacrylic acid and polyfunctional epoxy resins such as the well known epichlorohydrin/bisphenol A type resins.

(F) The addition polymers of monomers having two or more ethylenically unsaturated bonds, i.e.

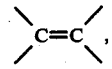

wherein the polymer has residual sites of unsaturation capable of undergoing polymerization initiated by actinic radiation. One can mention as being illustrative of such resins, the homo- and copolymers of butadiene, such as polybutadiene and styrene-butadiene copolymers.

The above mentioned oligomers or resins are intended to be merely illustrative of those useful in the compositions of this invention and are not intended to be all-inclusive. Any other known radiation reactive oligomers or resins having the aforementioned viscosity are suitable.

The radiation reactive oligomer or resin, is present in the radiation curable coating compositions of this invention at a concentration of from 20 to 80 weight percent, preferably from 30 to 70 weight percent, based on the total weight of the coating composition.

If desired, there can also be present in the radiation curable coating compositions of this invention any of the polyfunctional monomeric acrylate or methacrylate compounds which are known to those skilled in the art to function as crosslinking agents in radiation curable coating compositions. The suitable polyfunctional monomeric acrylate or methacrylate compounds will be known to those skilled in the art without further elaboration herein. Nonetheless, one can mention, as being merely illustrative thereof, neopentyl glycol diacrylate, 2',2'-dimethyl-3'-hydroxy propyl 2,2,-dimethyl-3-hydroxypropionate diacrylate, 1,3-butanediol diacrylate, ethylene glycol diacrylate, diethylene glycol diacrylate, triethylene glycol diacrylate, trimethylol propane triacrylate, 2-butene-1,4-diol diacrylate, 1,2,6-hexanetriol triacrylate, pentaerythritol triacrylate, pentaerythritol tetracrylate, tripopylene glycol diacrylate, and the like, an adduct of two moles of a hydroxyalkyl acrylate compound such as hydroxyalkyl acrylate, with one mole of a diisocyanate such as tolylene diisocyanate or isophorone diisocyanate, or the compounds obtained by substituting methacrylyl groups for any of the acrylyl groups of the foregoing compounds.

The polyfunctional monomeric acrylate or methacrylate crosslinking agent can be present in the radiation curable coating composition at a concentration of up to 50 weight percent, based on the total weight of the composition and preferably is present at a concentration of from 10 to 50 weight percent.

When non-ionizing radiation, e.g. ultraviolet, is to be used to cure the radiation curable coating compositions, there is a photoinitiator present in the composition. The photoinitiator can be present at a concentration of up to about 10 weight percent, preferably from about 1 to about 5 weight percent, based on the total weight of the composition.

The photoinitiators which can be used are well known to those skilled in the art and require no further description herein for them to know what they are. Nevertheless, one can mention as illustrative of suitable photoinitiators, 2,2-diethoxyacetophenone, 2- or 3- or 4-bromoacetophenone, 3- or 4-bromoacetophenone, benzaldehyde, benzoin, the allyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, 1,3-diphenyl-2-propanone, 1,4-naphthyl-phenylketone, 2,3-pentanedione, propiophenone, chlorothioxanthone, xanthone and the like, or a mixture of these.

Those skilled in the art of photochemistry are fully aware that so-called "photoactivators" or "photosynergists" can be used in combination with the aforementioned photoinitiators and that synergistic effects are sometimes achieved when such combinations are used. Photoactivators are well known to those skilled in the art and require no further description herein for them to know what they are. Nonetheless, one can mention as illustrative of suitable photoactivators methylamine, tributylamine, N-methyldiethanolamine, 2-aminoethylethanolamine, allylamine, cyclohexylamine, diphenylamine, ditolylamine, trixylylamine, tribenzylamine, n-cyclohexylethylenimine, piperadine, N-methylpiperazine, 2,2-dimethyl-1,3-bis-(3-N-morpholinyl)propionyloxy propane, and the like, or any mixture of these. The photoactivators, when used, are employed in the usual effective amounts, which are known to those skilled in the art.

In addition to the above mentioned components, the radiation curable coating compositions of this invention can contain any other additives which are conventionally employed in radiation curable coating compositions of the prior art, such as pigments, wetting agents, flatting agents, slip additives, etc. and these are employed in the usual known effective concentrations.

If desired, there can also be present a small amount, preferably not more than about 5 weight percent of a non-reactive solvent or a monofunctional monomeric acrylate compound, but from the standpoint of producing a 100 percent solids system with minimum toxicity, it is preferred that these not be present.

The radiation curable coating composition is produced by admixing the aforementioned components in any manner suitable for achieving a homogeneous composition. The compositions are applied to substrates as films using conventional application techniques of the coatings industry such as roller coating, reverse roll coating, brushing, spraying, knife coating, silk screening, dip-pad-squeeze, etc.

The applied radiation curable coating composition can be cured by the known radiation curing methods such as exposure to ultraviolet light, x-ray, alpha particles, beta-rays, and electron beam. Irradiation can be performed using any of the known and commonly available types of radiation curing equipment, for example, curing may be done by low, medium, or high pressure mercury lamps or with a swirlflow plasma arc radiation source by the process disclosed in U.S. Pat. No. 3,650,699. Curing can be carried out in an air atmosphere or in an inert gas atmosphere, such as nitrogen or argon. Exposure time required to cure the composition varies somewhat depending on the particular formulation, type and wavelength of radiation, energy flux, concentration of photoinitiator, and film thickness. Those skilled in the art of radiation technology will be able to determine the proper curing time for any particular composition. Generally, the cure time is rather short, that is, less than about 30 seconds.

The following examples are intended to further illustrate the invention described herein and are not intended to limit it in any way. In the examples, the following terms, listed in the left hand column below, were used in lieu of the more complete descriptions in the right hand column.

| | |
|---|---|
| Urethane acrylate oligomer A: | A reaction product of poly-epsilon-caprolactone diol having an average molecular weight of 530, isophorone diisocyanate and 2-hydroxyethyl acrylate, having a viscosity of 266,400 cps. at 25° C. |
| Urethane acrylate oligomer B: | A reaction product of a copoly(oxyethylene-oxypropylene) diol having an average molecular weight of 2,800, isophorone diisocyanate, and 2-hydroxyethyl acrylate, having a viscosity of about 600,000 cps. at 25° C. |
| Urethane acrylate oligomer C: | An acrylate-capped product having a viscosity of about 400,000 cps. at 25° C. produced by: reacting a molar excess of tolylene diisocyanate with poly-epsilon-caprolactone (average m. wt. 125); then reacting the product thus obtained with copoly(oxyethylene-oxypropylene) diol (average m. wt. 2,800), isophorone diisocyanate, and 2-hydroxyethyl acrylate in sequence. |
| Urethane acrylate crosslinker: | An adduct of two moles of hydroxyethyl acrylate and one mole of an isophorone diisocyanate. |

EXAMPLE 1

This example illustrates the preparation and curing of a radiation curable coating composition using 2,4-pentanedione as the reactive diluent. A composition was prepared by mixing to a uniform consistency the components shown in the table below at the indicated concentrations. Using wire wound rods, the composition was applied in 3-mil and 6-mil film thicknesses to a glass plate. The compositions on the glass plate were cured to a solid, non-tacky state by 20 seconds of exposure, under a nitrogen blanket, to mercury arc lamps which delivered ultraviolet light at a flux of about 500 watts/square foot. The cured 3-mil film had a tensile strength of 4,208 psi and an ultimate elongation of 20%. Total evaporative loss from the composition was 4.8 weight percent for the 6-mil film and 8.4 weight percent for the 3-mil film. This indicated that most of the 2,4-pentanedione remained in the cured coating. A portion of the cured 3-mil film was removed with a razor blade, weighed to 0.001 gram and placed in a flask containing 50 grams of toluene to extract any unreacted 2,4-pentanedione. Gas chromatographic analysis of the extractant indicated the presence of 60 parts per million of unreacted 2,4-pentanedione.

| Composition | Grams |
|---|---|
| Urethane acrylate oligomer A* | 32 |
| 2,4-pentanedione | 21 |
| Urethane acrylate crosslinker | 26 |
| Neopentyl glycol diacrylate | 16 |

-continued

| Composition | Grams |
|---|---|
| Benzophenone | 3 |
| N-methyldiethanolamine | 2 |

*Oligomer contained 10 weight percent 2-hydroxyethyl acrylate.

EXAMPLE 2

This example illustrates the efficiency of 2,4-pentanedione in reducing the viscosity of urethane acrylate oligomer B in comparison with the ability of radiation reactive diluents of the prior art to do the same. Three homogeneous mixtures, each consisting of urethane acrylate oligomer B and a diluent were prepared as indicated in the table and the viscosities of the mixtures were measured on a Brookfield LVT viscometer (spindle No. 4) at room temperature and at 50° C. It can be seen that the mixture containing 2,4-pentanedione as the diluent had about the same viscosity as the mixture containing 2-hydroxylethyl acrylate as the diluent, and a substantially lower viscosity than that of the mixture containing 2-(N-methylcarbamoyloxy) ethyl acrylate.

|  | Grams Formulation Number | | |
|---|---|---|---|
|  | 1 | 2 | 3 |
| Urethane acrylate oligomer B | 42.5 | 42.5 | 42.5 |
| 2-(N-methylcarbamoyloxy) ethyl acrylate | 7.5 | — | — |
| 2-hydroxyethyl acrylate | — | 7.5 | — |
| 2,4-pentanedione | — | — | 7.5 |

|  | Viscosity, cps × $10^{-3}$ | |
|---|---|---|
| Formulation No. | Room temp. | 50° C. |
| 1 | 610 | 137 |
| 2 | 125 | 42 |
| 3 | 114 | 40 |

EXAMPLE 3

Using a procedure similar to that of Example 1, two radiation curable coating compositions were prepared according to the formulations indicated in the table below. Formulation I contained 2,5-hexanedione as the diluent and Formulation II, which contained 2-hydroxyethyl acrylate as the diluent, was prepared as a control. The compositions were applied to a glass plate as 3-mil films and cured by 20 seconds of exposure to ultraviolet light by a procedure similar to that of Example 1. Tensile strength and ultimate elongation of the films appears in the table below.

|  | Grams | |
|---|---|---|
|  | I | II |
| Urethane acrylate oligomer A | 32 | 32 |
| 2,5-hexanedione | 21 | — |
| 2-hydroxyethyl acrylate | — | 21 |
| Urethane acrylate crosslinker | 26 | 26 |
| Neopentyl glycol diacrylate | 16 | 16 |
| Benzophenone | 3 | 3 |
| N-methyldiethanolamine | 2 | 2 |

|  | Tensile strength, psi | Elongation, % |
|---|---|---|
| I | 3,235 | 28.3 |
| II | 2,429 | 43.0 |

EXAMPLE 4

Two radiation curable coating compositions were prepared by mixing to a uniform consistency the components indicated in the table below at the indicated concentrations. Composition I contained 2,4-pentanedione as the diluent therein and composition II, which contained 2-hydroxyethyl acrylate, was prepared as a control. The compositions were each applied to glass plates as 3-mil and 6-mil films and cured by a procedure similar to that of Example 1, except that one set of films was cured in an air atmosphere and one set was cured in a nitrogen atmosphere. Tensile strength and elongation of the cured films is reported below.

|  | Grams | |
|---|---|---|
|  | I | II |
| Urethane acrylate oligomer A | 32 | 32 |
| 2,4-pentanedione | 21 | — |
| 2-hydroxyethyl acrylate | — | 21 |
| Urethane acrylate crosslinker | 26 | 26 |
| Neopentyl glycol diacrylate | 16 | 16 |
| Benzophenone | 3 | 3 |
| N-methyldiethanolamine | 2 | 2 |

|  | Tensile strength, psi. | | Elongation % | |
|---|---|---|---|---|
|  | Air | Nitrogen | Air | Nitrogen |
| I | 4,364 | 3,832 | 24 | 27 |
| II | 3,583 | 2,488 | 30 | 22 |

EXAMPLE 5

This example compares the ability of 2,4-pentanedione and 2-hydroxyethyl acrylate to reduce the viscosity of urethane acrylate oligomer A. Both 2,4-pentanedione and 2-hydroxyethyl acrylate were mixed to a uniform consistency with urethane acrylate oligomer A at concentrations of 10 weight percent and 21 weight percent, based on the total weight of the oligomer and the diluent. The viscosities of the various mixtures were measured, using a Brookfield LVT viscometer (spindle No. 4) and appear in the table below.

|  | Brookfield viscosity, cps | |
|---|---|---|
| Diluent | Room temp. | 50° C. |
| None | 266,400 | 82,500 |
| 10% HEA* | 132,000 | 46,800 |
| 10% PD** | 82,000 | 27,800 |
| 21% HEA | 270 | 70 |
| 21% PD | 70 | 30 |

*HEA = 2-hydroxyethyl acrylate
**PD = 2,4-pentanedione

EXAMPLE 6

This example illustrates the preparation, curing and the tensile properties of a radiation curable coating composition using 1,3-cyclohexanedione as a reactive component.

Employing a procedure similar to that of Example 1, a radiation curable coating composition was prepared according to the formulation shown below. The composition was applied to glass plate as a 3-mil film, and cured by 20 seconds of exposure to ultraviolet light by a procedure similar to that of Example 1. The ultimate tensile strength and elongation of the cured film were; 2,127 psi and 185%, respectively.

|  | Grams |
|---|---|
| Urethane acrylate oligomer C* | 20.0* |
| 1,3-cyclohexanedione | 3.0 |
| N-methyldiethanolamine | 0.4 |
| Benzophenone | 0.6 |
| Diacrylate crosslinker** | 3.0 |

*Consisted of 17.3 grams oligomer and 2.7 grams toluene
**3'-acryloxy-2',2'-dimethylpropyl 3-acryloxy-2,2-dimethylpropionate A 6.4-gram portion of the cured film (about 3 mil) was removed with a razor blade from the glass plate, and was placed in a flask containing 200 grams of isopropanol to extract any unreacted 1,3-cyclohexanedione. Gas chromatographic analysis of the extractant indicated the presence of 0.069 weight percent, 1,3-cyclohexanedione, which was equivalent to 20.1% of 1,3-cyclohexanedione added to the formulation. This indicates that about 80% (79.9%) of 1,3-cyclohexanedione reacted with the oligomer.

What is claimed is:

1. A radiation curable coating composition comprising:
(A) from 20 to 80 weight percent of a radiation reactive oligomer or resin containing at least one ethylenically unsaturated site per molecule having a viscosity of from 100 cps. to 800,000 cps. at 25° C.;
(B) from 5 to 30 weight percent of a dione compound chosen from the group consisting of,
(i) alkanediones represented by the formula

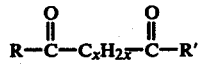

wherein x is 1 or 2 and R and R' are each alkyl of from 1 to 4 carbon atoms which may be the same as, or different from, each other, and (ii) cycloalkanediones of the formula

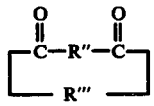

wherein R" is methylene or ethylene and R''' is an alkylene segment completing a 5 to 8 carbon ring structure;
(C) from 0 to 50 weight percent of a polyfunctional monomeric acrylate or or methacrylate crosslinker; and
(D) from 0 to 10 weight percent of a photoinitiator.

2. A radiation curable coating composition as claimed in claim 1, wherein said dione compound is chosen from the group consisting of 2,4-pentanedione and 2,5-hexanedione.

3. A radiation curable coating composition as claimed in claim 1, wherein said radiation reactive oligomer or resin is an acrylate-capped polyurethane.

4. A radiation curable coating composition as claimed in claim 1, wherein (B) is present at a concentration of from 10 to 20 weight percent.

5. A radiation curable coating composition as claimed in claim 1, wherein (D) is present at a concentration of from 1 to 5 weight percent.

6. A radiation curable coating composition as claimed in claim 1, wherein (A) is present at a concentration of from 30 to 70 weight percent.

7. A radiation curable coating composition as claimed in claim 1, wherein (A) is present at a concentration of from 30 to 70 weight percent; (B) is present at a concentration of from 10 to 20 weight percent; (C) is present at a concentration of from 10 to 50 weight percent; and (D) is present at a concentration of from 1 to 5 weight percent.

8. A radiation curable coating composition as claimed in claim 1, wherein there is additionally present up to 5 weight percent of a component chosen from the group consisting of nonreactive organic solvents and monofunctional monomeric acrylates.

9. A method of reducing the viscosity of a radiation curable coating composition containing a radiation reactive oligomer or resin containing at least one ethylenically unsaturated site per molecule which comprises admixing therewith a dione compound represented by the formula:

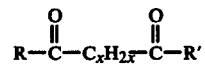

wherein x is 1 or 2 and R and R' are each alkyl of up to 4 carbon atoms, which may be the same as, or different from, each other.

10. A method as claimed in claim 9, wherein said dione compound is chosen from the group consisting of 2,4-pentanedione and 2,5-hexanedione.

* * * * *